(12) United States Patent
Lamba et al.

(10) Patent No.: US 11,617,069 B2
(45) Date of Patent: Mar. 28, 2023

(54) PROVIDING EMERGENCY LOCATION INFORMATION

(71) Applicant: Apple Inc., Cupertino, CA (US)

(72) Inventors: Gaurav Lamba, Los Altos, CA (US); Abdus Samad, Dusseldorf (DE); Amandeep Singh Bedi, London (GB); Krisztian Kiss, Hayward, CA (US); Rafael L. Rivera-Barreto, Miami, FL (US); Rohan C. Malthankar, San Jose, CA (US); Samy Touati, Pleasanton, CA (US); Vijay Venkataraman, San Jose, CA (US); Vinash Kaushal, Beaconsfield (GB)

(73) Assignee: Apple Inc., Cupertino, CA (US)

( * ) Notice: Subject to any disclaimer, the term of this patent is extended or adjusted under 35 U.S.C. 154(b) by 76 days.

(21) Appl. No.: 17/248,966

(22) Filed: Feb. 16, 2021

(65) Prior Publication Data
US 2021/0258761 A1 Aug. 19, 2021

Related U.S. Application Data

(60) Provisional application No. 62/976,959, filed on Feb. 14, 2020.

(51) Int. Cl.
| | |
|---|---|
| *H04W 4/90* | (2018.01) |
| *H04W 76/50* | (2018.01) |
| *H04W 4/14* | (2009.01) |
| *H04W 4/02* | (2018.01) |
| *H04W 4/029* | (2018.01) |

(52) U.S. Cl.
CPC ............ *H04W 4/90* (2018.02); *H04W 4/025* (2013.01); *H04W 4/029* (2018.02); *H04W 4/14* (2013.01); *H04W 76/50* (2018.02)

(58) Field of Classification Search
CPC ....... H04W 4/90; H04W 4/029; H04W 76/50; H04W 4/025; H04W 4/14
See application file for complete search history.

(56) References Cited

U.S. PATENT DOCUMENTS

| | | | | |
|---|---|---|---|---|
| 2009/0104906 A1* | 4/2009 | Lee | ........................ | H04W 48/20 455/435.1 |
| 2009/0296689 A1* | 12/2009 | Bakker | ............... | H04L 65/1016 370/352 |
| 2013/0203373 A1* | 8/2013 | Edge | ........................ | H04W 4/12 455/404.1 |
| 2020/0100085 A1* | 3/2020 | Buckley | ................ | H04W 48/14 |

* cited by examiner

*Primary Examiner* — Umair Ahsan
(74) *Attorney, Agent, or Firm* — Fay Kaplun & Marcin, LLP

(57) ABSTRACT

A user equipment (UE) may identify that an emergency call is being initiated and send further messages including the location of the UE. The UE receives emergency location signaling parameters, identifies that an emergency communication has been initiated by the UE based on the emergency location signaling parameters and transmits a message to an endpoint associated with emergency services based on the identification of the emergency message being initiated, wherein the message includes location information for the UE.

20 Claims, 3 Drawing Sheets

PROVIDING EMERGENCY LOCATION INFORMATION

BACKGROUND

A user equipment (UE) may be configured to provide a message to emergency services that includes location information. The location information may indicate a geographical location at which the message originated. For example, the UE may identify that a mobile originating emergency call has been initiated. This may trigger the UE to send the message including the location information to an endpoint associated with the relevant emergency services.

Generally, different geographical regions have different emergency services. For example, different regions/countries are under the jurisdiction of different law enforcement entities. Under conventional circumstances, to ensure that the UE is aware of the telephone numbers associated with emergency services across various geographical regions, the carrier may provision the UE with an emergency number list in a carrier bundle. However, not only are carrier bundles not available in every geographical region, utilizing a carrier bundle to provision UEs with this type of information is labor intensive and expensive.

SUMMARY

Some exemplary embodiments are related to a processor of a user equipment (UE) configured to perform operations. The operations include receiving emergency location signaling parameters, identifying that an emergency communication has been initiated by the UE based on the emergency location signaling parameters and transmitting a message to an endpoint associated with emergency services based on the identification of the emergency message being initiated, wherein the message includes location information for the UE.

Other exemplary embodiments are related to a user equipment (UE) having a transceiver configured to communicate with a network and a processor communicatively coupled to the transceiver and configured to perform operations. The operations include receiving emergency location signaling parameters, identifying that an emergency communication has been initiated by the UE based on the emergency location signaling parameters, wherein the emergency communication is one of a voice call or a text message and transmitting a message to an endpoint associated with emergency services based on the identification of the emergency message being initiated, wherein the message includes location information for the UE.

Still further exemplary embodiments are related to a processor of a network entity configured to perform operations. The operations include receiving a request from a user equipment (UE) and transmitting emergency location signaling parameters to the UE.

DETAILED DESCRIPTION

Figure 1:
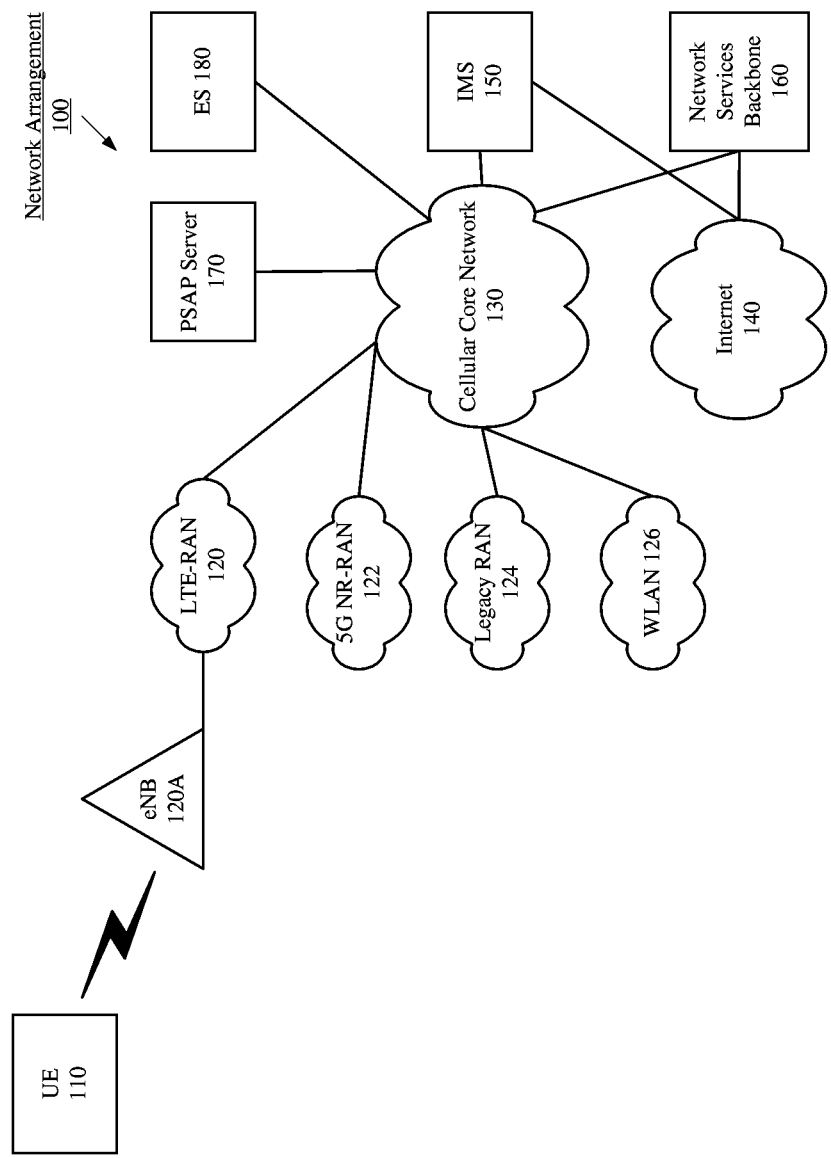
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments relate to a user equipment (UE) providing a message to emergency services that includes location information. The location information may indicate the location at which the message originated. Various exemplary procedures for provisioning the UE with parameters to enable this functionality will be described in more detail below.

The exemplary embodiments are described with regard to advanced mobile location (AML). Throughout this description, AML generally refers to the concept of the UE sending a message to an endpoint associated with emergency services that includes location information corresponding to the UE. From the perspective of the UE, an AML procedure may include identifying that a mobile originating emergency call has been initiated by the UE, collecting location information corresponding to the UE and then transmitting a short message service (SMS) to an endpoint associated with emergency services. The message is intended to help emergency services locate the user of the UE. To ensure the privacy of the user, a mechanism configured to perform AML procedures may be restricted to only be utilized in association with an emergency call and only communicate with network endpoints associated with emergency services. However, reference to AML is merely provided for illustrative purposes, different entities may refer to a similar concept by a different name.

The emergency services in different geographical regions have different telephone numbers. For example, the general emergency telephone number in one country (e.g., 911, 112, etc.) is different than the general emergency telephone number in another country. Even within the same geographical region there may be multiple emergency service entities (e.g., police, fire, etc.), each with their own respective telephone numbers. Under conventional circumstances, to ensure that the UE is able to identify that a call has been initiated to one of the multiple different telephone numbers associated with emergency services, the UE may be provisioned with a list of emergency contact numbers in a carrier bundle.

A carrier bundle generally refers to a set of information associated with a cellular carrier that is stored on the UE and utilized for any of a wide variety of different types of operations. There is a large number of cellular carriers and thus, a large number of different carrier bundles. The contents of the carrier bundle may vary from carrier to carrier. However, carrier bundles are not utilized in every geographical region. Accordingly, under conventional circumstances, some UEs do not receive the information needed to perform an AML procedure. Further, utilizing a carrier bundle to provision UEs with this type of information is labor intensive and expensive.

The exemplary embodiments are described with regard to provisioning the UE with parameters related to AML in an efficient and inexpensive manner. In a first aspect, the exemplary embodiments relate to provisioning the UE with various parameters via non-access stratum (NAS) signaling. In a second aspect, the exemplary embodiments relate to provisioning the UE with various parameters via an entitlement server. In a third aspect, the exemplary embodiments relate to provisioning the UE with various parameters via subscriber identity module (SIM) settings. The parameters may provide the basis for the UE to perform an AML procedure or any other appropriate procedure. However, the exemplary embodiments are not limited to AML. Those skilled in the art will understand that the exemplary techniques described herein may apply to any appropriate procedure related or unrelated to emergency services.

FIG. 1 shows an exemplary network arrangement 100 according to various exemplary embodiments. The exemplary network arrangement 100 includes a UE 110. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. An actual network arrangement may include any number of UEs being used by any number of users. Thus, the example of a single UE 110 is merely provided for illustrative purposes.

In the example of the network configuration 100, the networks with which the UE 110 may wirelessly communicate with are an LTE radio access network (LTE-RAN) 120, a 5G New Radio (NR) radio access network (5G NR-RAN) 122, a legacy radio access network (RAN) 124 and a wireless local access network (WLAN) 126. However, the UE 110 may also communicate with other types of networks and the UE 110 may also communicate with networks over a wired connection. Therefore, the UE 110 may include an LTE chipset to communicate with the LTE-RAN 120, a 5G NR chipset to communicate with the 5G NR-RAN 122, a legacy chipset to communicate with the legacy RAN 124 and an ISM chipset to communicate with the WLAN 126.

The LTE-RAN 120, the 5G NR-RAN 122 and the legacy RAN 124 may be portions of cellular networks that may be deployed by cellular providers (e.g., Verizon, AT&T, T-Mobile, etc.). These networks 120, 122, 124 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 126 may include any type of wireless local area network (WiFi, Hot Spot, soft AP, IEEE 802.11 networks, etc.).

The UE 110 may connect to the LTE-RAN 120 via an evolved Node B (eNB) 120A. Those skilled in the art will understand that any association procedure may be performed for the UE 110 to connect to the LTE-RAN 120. For example, as discussed above, the LTE-RAN 120 may be associated with a particular cellular provider where the UE 110 and/or the user thereof has a contract and credential information (e.g., stored on a SIM card). Upon detecting the presence of the LTE-RAN 120, the UE 110 may transmit the corresponding credential information to associate with the LTE-RAN 120. More specifically, the UE 110 may associate with a specific cell (e.g., the eNB 120A of the LTE-RAN 120). As mentioned above, the use of the LTE-RAN 120 is for illustrative purposes and any type of network may be used. For example, the UE 110 may connect to 5G NR-RAN 122 via a gNB (not pictured) or the legacy RAN 124 via a Node B (NB)(not pictured).

The network arrangement 100 also includes a cellular core network 130, the Internet 140, an IP Multimedia Subsystem (IMS) 150, and a network services backbone 160. The cellular core network 130 may be considered to be the interconnected set of components that manages the operation/traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

The network arrangement 100 may further include a public safety answering point (PSAP) server 170. The PSAP server 170 may provide information to one or more emergency service entities. Some exemplary embodiments will be described with regard to the UE 110 sending a signal to the PSAP server 170 that includes location information corresponding to the UE 110. In this example, the PSAP server 170 is shown as being connected to the cellular core network 130. However, this is merely for illustrative purposes, in an actual network arrangement the PSAP server 170 may reside in the cellular core network 130 or may reside separate from the cellular core network 130 in any location in which the PSAP server 170 may directly or indirectly receive a signal from the UE 110. Further, an actual network arrangement may include any appropriate number of PSAP servers 170. Thus, the example of a single PSAP server 170 is merely provided for illustrative purposes.

The network arrangement 100 may further include an entitlement server (ES) 180. The ES 180 may be considered to be a server that is deployed on a per public land mobile network (PLMN) basis. The ES 180 may be managed by a carrier or another entity (e.g., third-party such as manufacturer of the UE 110, a service provider, etc.) and may include information about the feature set support for the corresponding PLMN. The feature set support may include, for example the support for various IMS services. In the example, the ES 180 is shown as being connected directly to the cellular core network 130. However, this is merely for illustrative purposes, in an actual network arrangement the ES 180 may reside in the cellular core network 130 or may reside separate from the cellular core network 130 in any location in which the ES 180 may directly or indirectly communicate with the UE 110. Further, as indicated above, an actual network arrangement may include multiple entitlement servers. Thus, the example of the single ES 180 is merely provided for illustrative purposes.

Figure 2:
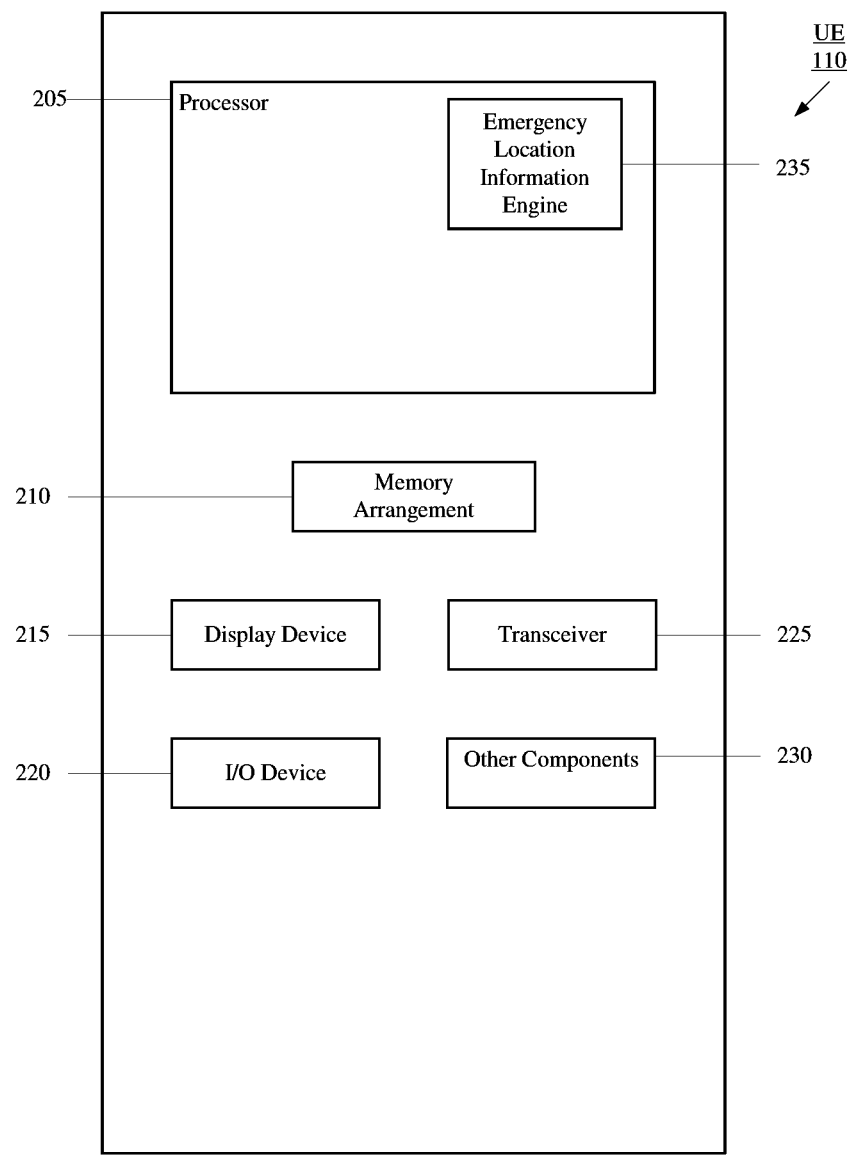
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225, and other components 230. The other components 230 may include, for example, an audio input device, an audio output device, a battery, a data acquisition device, ports to electrically connect the UE 110 to other electronic devices, sensors to detect conditions of the UE 110, etc.

The processor 205 may be configured to execute a plurality of engines for the UE 110. For example, the engines may include an emergency location information engine 235. The emergency location information engine 235 may manage parameters corresponding to emergency services that are received from any of a variety of different sources and send a signal to an endpoint associated with emergency services that include location information corresponding to the UE 110.

The above referenced engine being an application (e.g., a program) executed by the processor 205 is only exemplary. The functionality associated with the engine may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the LTE-RAN 120, the 5G NR-RAN 122, the legacy RAN 124 and the WLAN 126. Accordingly, the transceiver 225 may operate on a variety of different frequencies or channels (e.g., set of consecutive frequencies).

Figure 3:
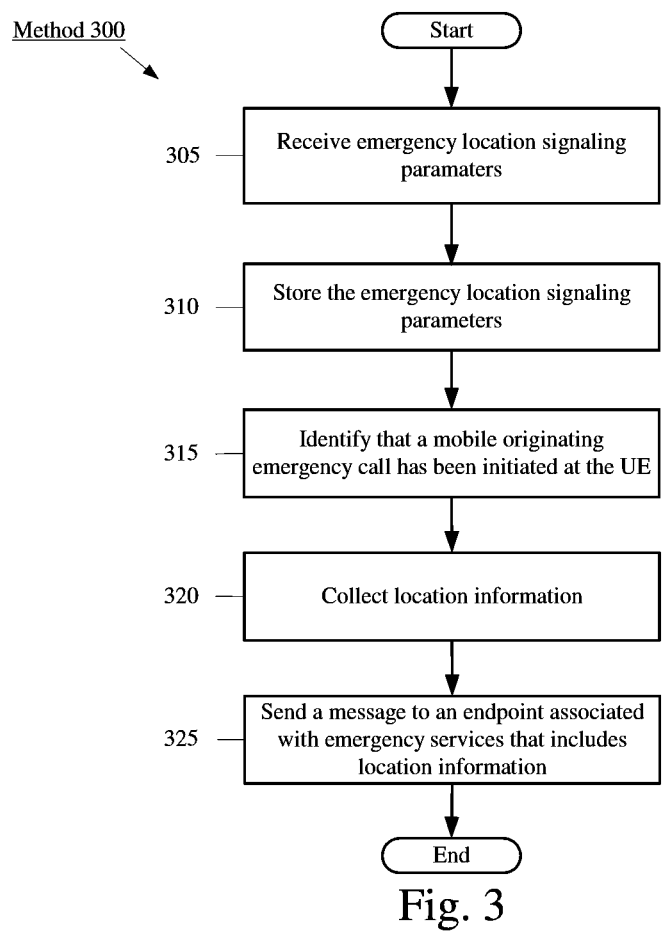
FIG. 3 shows an exemplary method for the UE to send location information to an endpoint associated with emergency services according to various exemplary embodiments.

FIG. 3 shows an exemplary method 300 for the UE 110 to send location information to an endpoint associated with emergency services according to various exemplary embodiments. The method 300 will be described with regard to the UE 110 of FIG. 2 and the network arrangement 100 of FIG. 1.

In 305, the UE 110 receives emergency location signaling parameters. Throughout this description, the term "emergency location signaling parameters" generally refers to various different types of information that may enable the UE 110 to i) identify that a mobile originating call to an emergency service has been initiated and/or ii) send a signal to an endpoint associated with emergency services that includes location information corresponding to the UE 110. For example, the emergency location signaling parameters may enable AML functionality. More specific examples of the type of information that may be encompassed by the term "emergency location signaling parameters" will be provided below.

In addition to triggering the UE 110 to send emergency location information to an endpoint associated with emergency services, detecting that an emergency service has been dialed may also trigger the UE 110 to enter an emergency call state. In the emergency call state, the UE 110 may perform various operations such as but not limited to, disabling screen lock, initiating a do not disturb mode, disabling incoming/outgoing voice calls, disabling incoming/outgoing SMS (e.g., other than SMS with emergency location information), etc. In this state, the UE 110 may also be configured to allow the incoming calls from a PSAP or another emergency service entity to ensure that an emergency service operator may call back the UE 110 if the emergency call is dropped. Thus, identifying that an emergency call has been made allows the UE 110 to provide emergency location information and/or perform other operations that may help the user in a scenario in which emergency services may be needed.

The UE 110 may receive emergency location signaling parameters from any of a variety of different sources. One exemplary source of emergency location signaling parameters may include NAS signaling. Those skilled in the art will understand that NAS signaling may occur during an attach procedure or any other type of registration procedure. Examples of provisioning the UE 110 with emergency location signaling parameters via NAS signaling are provided below.

Consider the following exemplary scenario, the UE 110 is camped on a cell of the corresponding network. When camped, to receive the full scope of functionality normally available via the network connection, the UE 110 may register with the network. Network registration may be performed using NAS signaling. If the network is an LTE network, the NAS signaling may occur between the UE 110 and a management mobility entity (MME) of the cellular core network 130. If the network is a 5G network, the NAS signaling may occur between the UE 110 and the access and mobility management function (AMF) of the cellular core network 130. Thus, MMEs and AMFs may manage emergency location signaling parameters on the network side and provision the UE 110 with the emergency location signaling parameters via NAS signaling.

The network may send emergency location signaling parameters to the UE 100 during a registration procedure (e.g., in an attach accept message or any other appropriate registration message) and/or during a registration update procedure. For example, the network may provision the UE 110 with an emergency number list that contains telephone numbers for various public safety services local to the corresponding geographical region. The telephone numbers may be characterized as emergency numbers by the serving network. As will be described below, the emergency telephone numbers provided to the UE 110 via NAS signaling may allow the UE 110 to identify that an emergency call has been initiated.

In some embodiments, one or more emergency telephone numbers provided to the UE 110 during NAS signaling may be encoded with a sub service field that indicates a type of emergency service corresponding to the telephone number. For example, an emergency service telephone number provided to the UE 110 may be associated with an emergency service uniform resource name (URN). Those skilled in the art will understand that an emergency service URN is a service URN with top level service type of SOS. Examples of emergency service URNs include, but are not limited to, urn:service:sos, urn:service:sos:ambulance, urn:service:sos:police, urn:service:sos:fire, urn:service:sos:marine, urn:service:sos:mountain, urn:service:sos.ecall.manual, urn:service:sos.ecall.automatic, etc. Emergency service URNs can also be country specific. For example, "urn:service:sos.country-specific.xy.567" may represent a type of emergency service with a telephone number of 567 in a country identified by the abbreviation "xy." Accordingly, emergency location signaling parameters may include a set of one or more telephone numbers associated with emergency services and emergency service URNs.

Another type of emergency location signaling parameter that may be provided to the UE 110 via NAS signaling may include a short message service center (SMSC) address. Those skilled in the art will understand that SMSC generally refers to a network component that manages SMS operations for a PLMN and/or a geographical region. By provisioning the UE 110 with the SMSC address in NAS signaling, the UE 110 may be aware of a visited PLMN's SMSC address and thus, messages that include emergency location information may reach their intended endpoint faster. An SMSC address may be provided per emergency number or may be associated with a set of emergency numbers. During operation, any changes to the SMSC addresses may be provided to the UE 110 via a UE configuration update command.

Further, in some embodiments, one or more SMSC addresses may be associated with an indication of a SMS format (e.g., data SMS, i.e. User-Data-Header-Indicator flag is set in the packet data unit (PDU) type field of the SMS message, or regular SMS) that is to be used for an SMS including emergency location information. Accordingly, emergency location signaling parameters may include an SMSC address and a SMS format.

In some scenarios, the UE 110 may attempt to register with the network but may not be permitted to receive the full scope of functionality normally available to the UE 110 via the network connection. However, the UE 110 may still be permitted to receive information corresponding to emergency services and transmit information corresponding to emergency services. This type of scenario may occur when the UE 110 attempts to register with a visited PLMN that is not compatible with the carrier associated with the UE 110. When the UE 110 is not permitted to receive the full scope of functionality normally available to the UE 110 via the network connection, the UE 110 may be characterized as being in limited service. Those skilled in the art will understand that there may be a variety of different reasons for the UE 110 to be in limited service.

When the UE 110 is in limited service, the UE 110 may be triggered to send repeated messages to the SMSC. To avoid denial of service (DoS) on the network side that may occur from these repeated messages, the SMSC addresses mentioned above may not be provisioned to the UE 110 when the UE 110 is in limited service. Alternatively, when the UE 110 is in limited service, the UE 110 may be provided with the SMSC addresses but may be restricted to transmitting a predetermined number of emergency location SMS within a predetermined time window.

Another exemplary source of emergency location signaling parameters may include the ES 180. For example, when connected to the network, the UE 110 may communicate with the ES 180 and receive emergency location signaling parameters such as, but not limited to, telephone numbers for emergency service agencies, SMS short codes for emergency services, SMS addresses for endpoints with emergency services, SMS format, etc. The ES 180 may be configured to provide per subscriber information. Thus, messages sent by the UE 110 to the ES 180 may identify the account/subscriber associated with the UE 110.

In some exemplary embodiments, the UE 110 and the ES 180 may participate in a discoverability message exchange. This type of messaging exchange may include a request sent by the UE 110 to the ES 180 for configuration data supported by the ES 180. In response, the ES 180 may send a message to the UE 110 that indicates that information related to AML (or a similar type of service) is stored on the ES 180. Further messages may then be exchanged between the UE 110 and the ES 180 to provision the UE 110 with emergency location signaling parameters.

In other exemplary embodiments, the UE 110 may send an explicit request for emergency location signaling parameters. For example, the UE 110 may send a request for data related to AML to the ES 180. In response, the ES 180 may send emergency location signaling parameters to the UE 110.

In further exemplary embodiments, the ES 180 may be configured to send a push message to the UE 110 indicating that the emergency location signaling parameters managed by the ES 180 have been updated. For example, if a new local emergency number has been added to the ES 180 or a change has been made to AML SMS format, the ES 180 may send a push message to the UE 110. In response, the UE 110 may send a request to the ES 180 for emergency location signaling parameters. Subsequently, the ES 180 may send the updated emergency location signaling parameters to the UE 110. Accordingly, the ES 180 may trigger the UE 110 to request emergency location signaling parameters from the ES 180 or the UE 110 may be triggered to request emergency location signaling parameters for any other appropriate reason.

Another exemplary source of emergency location signaling parameters may include a SIM and/or an embedded SIM (eSIM). Those skilled in the art will understand the differences between a SIM and an eSIM. The UE 110 may be equipped with one or more SIMs and/or one or more eSIMs. Conventionally, SIMs and eSIMs are not configured to include emergency location signaling parameters. The exemplary embodiments relate to configuring the file contents of a SIM/eSIM to include emergency location signaling parameters such as, but not limited to, telephone numbers for emergency service agencies, SMS short codes for emergency services, SMS addresses for endpoints associated with emergency services, SMS format, mobile country codes (MCCs), etc. In some embodiments, the SIM/eSIM may be pre-provisioned to include emergency location signaling parameters. In other embodiments, file contents of the SIM/eSIM can be updated via over the air (OTA) signaling between the UE 110 and the network via, for example, Bearer Independent Protocol (BIP) procedures. To maintain the size of the SIM/eSIM file contents, the emergency location signaling parameters may be restricted to countries whose carriers are part of the operator controlled PLMN (OPLMN) list relevant to the UE 110.

The file contents of the SIM/eSIM may be pre-provisioned and/or updated regardless of the currently camped radio access technology (RAT). Thus, in the context of the network arrangement 100, the emergency location signaling parameters may be provided to the UE 110 regardless of whether the UE 110 is camped on the LTE-RAN 120, the 5G NR-RAN 122 or the legacy RAN 124. This SIM/eSIM technique allows carriers to provision the UE 110 with emergency location signaling parameters independent of the carrier bundle process.

The above examples are not intended to limit the exemplary embodiments in any way, any of the above referenced exemplary sources may provide any of the above referenced exemplary types of emergency location signaling parameters. Thus, the exemplary embodiments may apply to any appropriate source providing any appropriate type of emergency location signaling parameters to the UE 110.

In 310, the UE 110 stores the emergency location signaling parameters. For example, the emergency location signaling parameters may be stored in the memory arrangement 210. Even if the source of the emergency location signaling parameters is a SIM or an eSIM, the emergency location signaling parameters may be read from the SIM/eSIM file contents and then stored in the memory arrangement 210.

To manage the storage size for emergency location signaling parameters, the UE 110 may be configured to remove emergency location signaling parameters corresponding to a particular geographical region if the UE 110 has not entered the geographical region within a predetermined time window. If the UE 110 returns to the geographical region after its corresponding emergency location signaling parameters have been removed from the memory arrangement 210, one of the above referenced exemplary sources may provision the UE 110 with the emergency location signaling parameters relevant to that geographical location.

In 315, the UE 110 identifies that a mobile originating emergency call has been initiated. For example, the UE 110 may identify that a voice call has been initiated and the telephone number of the mobile terminating endpoint matches one of the telephone numbers stored in the memory arrangement 210 that is associated with an emergency service. The exemplary embodiments are not limited to an emergency call being initiated in any particular manner and the UE 110 may utilize any appropriate technique to determine that a call has been made to a telephone number that is associated with an emergency service.

In 320, the UE 110 collects location information corresponding to the UE 110. For example, the UE 110 may collect location information from a global navigation satellite system (GNSS) that provides an indication of the currently deployed location of the UE 110. In another example, the location information may be collected using WiFi protocols. However, the source of the location information is beyond the scope of the exemplary embodiments and any appropriate location information corresponding to the UE 110 may be utilized.

In 325, the UE 110 sends a message to an endpoint associated with emergency services that includes the location information. For example, the UE 110 may send an SMS to the PSAP 170. In other embodiments, the UE 110 may send a message to an endpoint in accordance with hypertext transfer protocol secure (HTTPS). As indicated above, the location information may help emergency services locate the user that initiated the emergency call at the UE 110.

An exemplary SMS may include information such as, but not limited to, a header, a latitude, a longitude, a radius, a time of positioning, a level of confidence, a positioning method, an international mobile subscriber identity (IMSI), an international mobile equipment identity (IMEI) and an MCC. However, the exemplary embodiments are not limited to SMS and the contents of the message are beyond the scope of the exemplary embodiments. Any appropriate type of signaling may be utilized to provide any appropriate type of location information to an endpoint associated with emergency services. Subsequently, the method 300 ends.

The method 300 was described with regard to the UE 110 being triggered to send location information to an endpoint associated with emergency services in response to an emergency call being initiated at the UE 110. However, the exemplary embodiments are not limited to a voice call. Any type of user input may trigger the UE 110 to send location information to an endpoint associated with emergency services. Thus, the emergency location signaling parameters may enable the UE 110 to send a message including location information to an endpoint associated with emergency services regardless of whether an emergency voice call is performed.

In other exemplary embodiments, there may be a determination and disambiguation between the type of emergency numbers that are sent. These exemplary embodiments may be used with any of the signaling for supplying emergency numbers to a UE described above, e.g., via NAS signaling, via over the air (OTA) SIM updates, using an entitlement server, etc., or any other manner of updating the UE with emergency numbers. In these exemplary embodiments, the emergency numbers may be categorized into different types. In one example, the emergency numbers may be categorized into three types, voice only, text only or both text and voice. However, these are only exemplary categories and the types of emergency numbers may be categorized based on any characteristic of the emergency number, e.g., area code, exchange, etc.

In this manner, when the UE is updated with the emergency numbers in these exemplary embodiments, the UE will understand if an emergency number is, for example, a voice only number, a text only number or both a voice and text number. This type of updating may allow the UE to satisfy regulatory requirements. For example, some countries have started separating voice only and text only emergency numbers. This type of up[dating may also help the UE operation. For example, the UE does not need to bring up a voice call for a text only number and vice versa.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

As described above, one aspect of the present technology is the gathering and use of data available from specific and legitimate sources to provide emergency location information to emergency services. The present disclosure contemplates that in some instances, this gathered data may include personal information data that uniquely identifies or can be used to identify a specific person. Such personal information data can include location-based data, identifiers, telephone numbers, email addresses, or any other personal information.

The present disclosure recognizes that the use of such personal information data, in the present technology, can be used to the benefit of users. For example, the personal information can be used to locate the user in an emergency situation.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the location information may only be provided to emergency services in response to explicit user input.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented with a bare minimum amount of personal information, such as only collecting location information during an emergency call.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed is:

1. A processor of user equipment (UE) configured to per operations comprising:

receiving emergency location signaling parameters, wherein the emergency location signaling parameters comprise an emergency number list that includes telephone numbers corresponding to public safety services local to a geographical region in which the UE is currently located and where at least one telephone number in the emergency number list is associated with an identification of a type of communication accepted by the at least one telephone number, the type of communication comprising one of a voice only number, a text only number or both a voice and text number;

identifying that an emergency communication has been initiated by the UE based on the emergency location signaling parameters; and transmitting a message to an endpoint associated with emergency services based on the identification of the emergency communication being initiated, wherein the message includes location information for the UE.

2. The processor of claim 1, wherein the emergency communication is one of a voice call or a text message.

3. The processor of claim 1, wherein the endpoint is identified based on the emergency location signaling parameters.

4. The processor of claim 1, wherein the emergency location signaling parameters further comprise an identification of a type of the public safety services corresponding to the telephone numbers.

5. The processor of claim 1, wherein the emergency location signaling parameters comprise a short message service center (SMSC) address, and wherein the message is a short messaging service (SMS) message that is transmitted to the SMSC address.

6. The processor of claim 1, wherein the message is transmitted a predetermined number of times within a predetermined time window.

7. The processor of claim 1, wherein the emergency location signaling parameters are received via a non-access stratum (NAS) registration message.

8. The processor of claim 1, wherein the emergency location signaling parameters are received from an entitlement server.

9. The processor of claim 1, wherein the emergency location signaling parameters are received from one of a subscriber identity module (SIM) of the UE or an embedded SIM (eSIM) of the UE.

10. The processor of claim 1, wherein the message comprises one of a header, a latitude, a longitude, a radius, a time of positioning, a level of confidence, a positioning method, an international mobile subscriber identity (IMSI), an international mobile equipment identity (IMEI) or a mobile country code (MCC).

11. The processor of claim 1, wherein the location information is retrieved from a global navigation satellite system (GNSS).

12. The processor of claim 1, wherein the message is a short messaging service (SMS) message.

13. The processor of claim 12, wherein the SMS comprises at least one of a header, a latitude, a longitude, a radius, a time of positioning, a level of confidence, a positioning method, an international mobile subscriber identity (IMSI), an international mobile equipment identity (IMEI) or a mobile country code (MCC).

14. The processor of claim 1, wherein the message is a hypertext transfer protocol secure (HTTPS) message.

15. A user equipment (UE), comprising:

a transceiver configured to communicate with a network; and a processor communicatively coupled to the transceiver and configured to perform operations comprising:

receiving emergency location signaling parameters, wherein the emergency location signaling parameters comprise an emergency number list that includes telephone numbers corresponding to public safety services local to a geographical region in which the UE is currently located and where at least one telephone number in the emergency number list is associated with an identification of a type of communication accepted by the at least one telephone number, the type of communication comprising one of a voice only number, a text only number or both a voice and text number;

identifying that an emergency communication has been initiated by the UE based on the emergency location signaling parameters; and transmitting a message to an endpoint associated with emergency services based on the identification of the emergency communication being initiated, wherein the message includes location information for the UE.

16. The UE of claim 15, wherein the endpoint is identified based on the emergency location signaling parameters.

17. The UE of claim 15, wherein the emergency location signaling parameters are received via a non-access stratum (NAS) registration message.

18. The UE of claim 15, wherein the emergency location signaling parameters are received from an entitlement server.

19. The UE of claim 15, wherein the emergency location signaling parameters are received from one of a subscriber identity module (SIM) of the UE or an embedded SIM (eSIM) of the UE.

20. The UE of claim 15, wherein the emergency communication is one of a voice call or a text message.

* * * * *

UNITED STATES PATENT AND TRADEMARK OFFICE
CERTIFICATE OF CORRECTION

PATENT NO. : 11,617,069 B2
APPLICATION NO. : 17/248966
DATED : March 28, 2023
INVENTOR(S) : Lamba et al.

It is certified that error appears in the above-identified patent and that said Letters Patent is hereby corrected as shown below:

In the Claims

Claim 1, Column 11, Line 66:
"A processor of user equipment (UE) configured to per" should read as "A processor of user equipment (UE) configured to perform".

Signed and Sealed this
Thirtieth Day of May, 2023

Katherine Kelly Vidal
*Director of the United States Patent and Trademark Office*